(12) United States Patent
Inyang et al.

(10) Patent No.: US 10,309,207 B2
(45) Date of Patent: Jun. 4, 2019

(54) METHODS OF CONTROLLING WELL BASHING

(71) Applicant: HALLIBURTON ENERGY SERVICES, INC., Houston, TX (US)

(72) Inventors: Ubong Inyang, Humble, TX (US); Dipti Singh, Kingwood, TX (US)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 0 days.

(21) Appl. No.: 15/752,115

(22) PCT Filed: Oct. 2, 2015

(86) PCT No.: PCT/US2015/053696
§ 371 (c)(1),
(2) Date: Feb. 12, 2018

(87) PCT Pub. No.: WO2017/058245
PCT Pub. Date: Apr. 6, 2017

(65) Prior Publication Data
US 2018/0238158 A1   Aug. 23, 2018

(51) Int. Cl.
*E21B 43/26* (2006.01)
*E21B 33/13* (2006.01)
*C09K 8/512* (2006.01)
*C09K 8/575* (2006.01)
*E21B 43/30* (2006.01)
*E21B 43/267* (2006.01)

(52) U.S. Cl.
CPC .......... *E21B 43/261* (2013.01); *C09K 8/512* (2013.01); *C09K 8/5756* (2013.01); *E21B 33/13* (2013.01); *E21B 43/26* (2013.01); *E21B 43/305* (2013.01); *E21B 43/267* (2013.01)

(58) Field of Classification Search
None
See application file for complete search history.

(56) References Cited

U.S. PATENT DOCUMENTS 3,028,914 A * 4/1962 Flickinger ............... E21B 43/26
                                                            166/284
3,419,070 A * 12/1968 Ernst ...................... E21B 43/119
                                                            166/253.1

(Continued)

OTHER PUBLICATIONS

International Search Report and Written Opinion for International Application No. PCT /US2015/053696 dated Jun. 24, 2016. (11 pages).

(Continued)

*Primary Examiner* — Anuradha Ahuja
(74) *Attorney, Agent, or Firm* — Haynes and Boone, LLP

(57) ABSTRACT

Methods of preventing or minimizing communication between adjacent wells include providing a treatment fluid including a conformance chemical, a diverting agent, and a hydraulic cement, introducing the treatment fluid into a first well adjacent a second well, allowing the conformance chemical, the diverting agent, and the hydraulic cement to block fractures in the first well to prevent or minimize communication between the first well and the second well, stimulating the second well after blocking the fractures, and recovering a formation fluid from the first well, the second well, or both.

20 Claims, 2 Drawing Sheets

(56) References Cited

U.S. PATENT DOCUMENTS

| | | | |
|---|---|---|---|
| 4,279,301 A * | 7/1981 | Williams | E21B 43/26 166/281 |
| 4,478,282 A | 10/1984 | Nolte et al. | |
| 4,974,677 A | 12/1990 | Shu | |
| 5,836,392 A | 11/1998 | Urlwin-Smith | |
| 6,192,986 B1 | 2/2001 | Urlwin-Smith | |
| 6,196,317 B1 | 3/2001 | Hardy | |
| 6,283,210 B1 * | 9/2001 | Soliman | E21B 33/138 166/270 |
| 6,784,141 B1 | 8/2004 | King et al. | |
| 7,004,254 B1 | 2/2006 | Chatterji et al. | |
| 7,232,793 B1 | 6/2007 | King et al. | |
| 7,271,134 B2 | 9/2007 | King et al. | |
| 7,458,424 B2 | 12/2008 | Odeh et al. | |
| 7,504,366 B2 | 3/2009 | Hanes, Jr. et al. | |
| 8,343,896 B2 | 1/2013 | Eoff et al. | |
| 8,459,352 B1 | 6/2013 | Kalman et al. | |
| 8,522,874 B2 | 9/2013 | Reddy et al. | |
| 8,684,081 B2 | 4/2014 | Al-Mutairi et al. | |
| 8,703,659 B2 | 4/2014 | Dalrymple et al. | |
| 8,985,212 B1 | 3/2015 | Crespo et al. | |
| 2006/0113077 A1 * | 6/2006 | Willberg | C09K 8/42 166/280.1 |
| 2006/0234871 A1 * | 10/2006 | Dalrymple | C09K 8/428 507/211 |
| 2008/0093073 A1 | 4/2008 | Bustos et al. | |
| 2008/0210423 A1 * | 9/2008 | Boney | C09K 8/68 166/281 |
| 2009/0125280 A1 * | 5/2009 | Soliman | E21B 43/26 703/1 |
| 2010/0224366 A1 * | 9/2010 | Lende | C04B 28/02 166/292 |
| 2010/0282466 A1 | 11/2010 | Brenneis et al. | |
| 2010/0323932 A1 * | 12/2010 | Bustos | C09K 8/26 507/219 |
| 2011/0220359 A1 * | 9/2011 | Soliman | C09K 8/588 166/305.1 |
| 2013/0000911 A1 * | 1/2013 | Reddy | C09K 8/035 166/305.1 |
| 2013/0098613 A1 | 4/2013 | Rose et al. | |
| 2015/0083423 A1 | 3/2015 | Brannon et al. | |
| 2015/0144347 A1 * | 5/2015 | Brannon | E21B 43/261 166/308.1 |
| 2015/0369023 A1 * | 12/2015 | MacPhail | E21B 43/12 166/269 |
| 2016/0215605 A1 * | 7/2016 | Fontenot | E21B 43/14 |
| 2016/0230526 A1 * | 8/2016 | Crews | E21B 43/17 |
| 2016/0376882 A1 * | 12/2016 | Mendell | C09K 8/594 166/245 |

OTHER PUBLICATIONS

Canadian Intellectual Patent Office, Application No. 2,997,025, First Office Action and Examination Report, dated Dec. 20, 2018, 5 pages, Canada.

* cited by examiner

METHODS OF CONTROLLING WELL BASHING

BACKGROUND

The present invention relates generally to methods of preventing communication between adjacent wells. In particular, the present invention relates to methods of preventing or minimizing communication between adjacent wells using conformance chemicals, diverting agents, or a combination thereof.

Wellbores drilled through subsurface rock formations to extract oil and gas may be treated by pumping various types of fluids into the formations. Fluid pumping treatments include, for example, hydraulic fracturing, wherein fluid is pumped into the formation at pressure that exceeds the fracture pressure of the formations. The fractures thus opened may be held open by pumping of proppant that supports the fracture structurally after the fluid pressure on the formation is relieved. Other fluid treatments may include, for example, pumping acid into the wellbore to dissolve certain minerals present in the pore spaces of the formations that reduce the formation permeability.

In certain land drilling locations, a number of wells are drilled from the same surface location, referred to as a "pad." The wells are drilled directionally to access oil reservoirs that extend horizontally from the pad.

Pad drilling is the practice of drilling multiple wellbores from a single surface location. Prior to the advent of pad drilling, an operator would drill a single well, disassemble the drilling rig, move it to a new location, and then repeat the process. Through pad drilling, 4, 10, 20 or more wells can be drilled from the pad. Doing so saves time and money that would be spent packing and moving the rig and preparing a new drilling site. It also means a smaller impact on the area landscape.

In current hydraulic fracturing operations, large amounts of fluid and proppants are pumped into a reservoir to unlock the vast amount of trapped oil and gas in a pad with multiple wellbores. In dealing with multiple wellbores, close proximity of fractures in adjacent wells is necessary to achieve economical production of hydrocarbons. Due to close spacing, however, communication in a multi-fractured well pad can cause many challenges, such as loss of production of an offset well and excessive consumption of fracturing fluid and proppant. Moreover, old wells can lose production after stimulating nearby wells, or there may be ineffective stimulation of a new well due to communication between the old well and the new well.

Thus, there is a continuing need for improved methods and compositions for preventing or minimizing "well bashing," or the detrimental communication between two or more adjacent wells. In particular, there is a need to block or otherwise seal the fractures of a first well that are most likely to communicate with a second, adjacent well.

BRIEF DESCRIPTION OF THE DRAWINGS

The following figures are included to illustrate certain aspects of the present invention, and should not be viewed as an exclusive embodiment. The subject matter disclosed is capable of considerable modification, alteration, and equivalents in form and function, as will occur to those skilled in the art and having the benefit of this disclosure.

DETAILED DESCRIPTION

According to several exemplary embodiments, methods are provided for preventing or minimizing communication between adjacent wells. According to several exemplary embodiments, the wells are oil and/or gas wells. The methods use conformance chemicals such as crosslinkable water soluble polymers, cement, or silica gel, diverting agents such as BioVert® CF biodegradable diverting agent (available from Halliburton Energy Services, Inc.), or a combination thereof to plug or block fractures in one well that will most likely communicate with an adjacent well. The conformance chemicals and/or diverting agents can be injected or pumped into a well to obstruct high permeability channels that lead to an adjacent well, thereby encouraging preference for liquid movement via lower permeability channels.

Challenges uniquely different to those associated with conformance/water control and diversion of fluid are encountered in well bashing. For example, temperatures and compositions of two wells must be taken into account instead of one well.

Figure 1A:
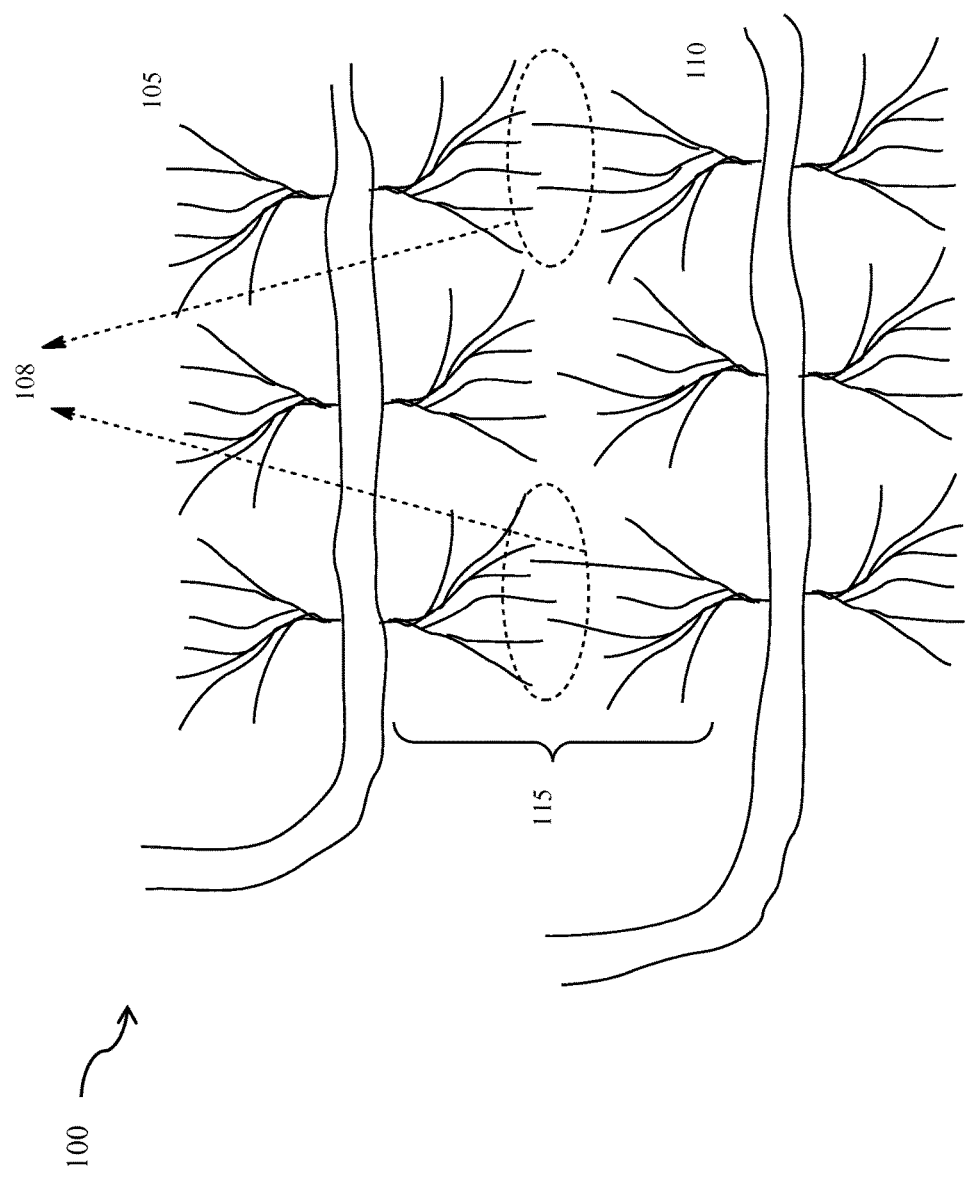
FIG. 1A illustrates the concept of well bashing.

FIG. 1A illustrates a multi-fractured well pad 100, which includes an old well 105, and a new well 110. Fractures in the old well 105 and fractures in the new well 110 can communicate at a well communication zone 108. These fractures are present in a well bashing zone 115, which encompasses an area where fractures in the old well 105 and fractures in the new well 110 are close together.

Figure 1B:
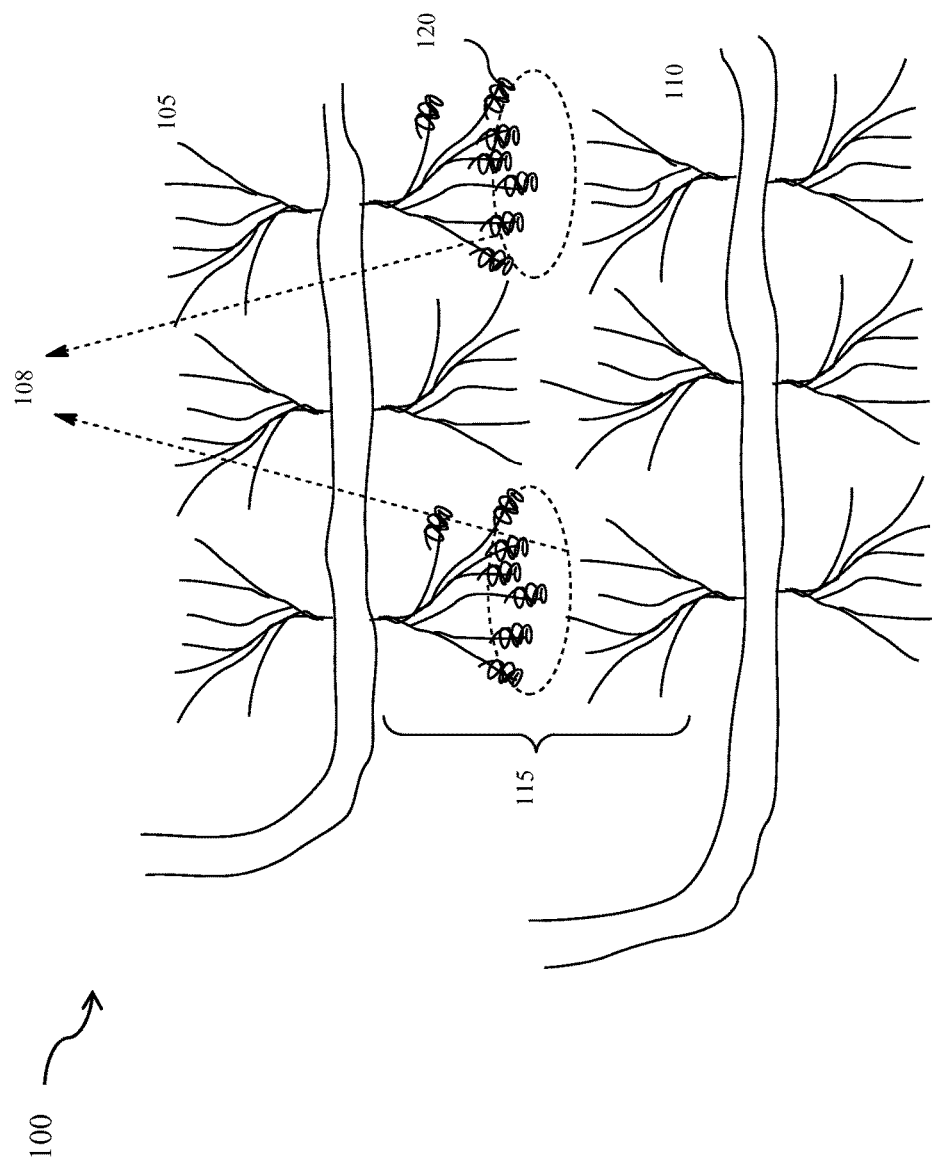
FIG. 1B illustrates fractures in an old well that are plugged or sealed to stop communication with the new well according to embodiments of the present invention.

FIG. 1B illustrates the plugging or blocking of fractures in the old well 105 with a material 120. Although FIG. 1B illustrates sealing of fractures in the old well 105, it should be understood that fractures in the new well 110 can additionally or alternatively be plugged or blocked. The plugged or blocked fractures are the fractures that are most likely to communicate with the fractures of the new well 110. Generally, these fractures are present in fluid paths that tend to accept the greatest fluid flow. That is, when the material is introduced or pumped into the old well 105, the material 120 will predominantly flow in the path of least resistance, towards the adjacent new well 110, which acts like a pressure sink (i.e., an area of low pressure). The chance that any fluid that is produced in the old well will flow towards the adjacent new well is minimized because the path is blocked. Any fluid that does make its way towards the new well does not reach the old well because the path to the new well is blocked.

According to several exemplary embodiments, the methods include providing a pre-pad fluid, pad fluid, and/or slurry that includes a material including one or more of a conformance chemical, diverting agent, or a combination thereof, introducing the pre-pad fluid, pad fluid, and/or slurry and material into a first well adjacent a second well, allowing the material to block fractures in the first well to prevent or minimize communication between the first well and the second well, and recovering a formation fluid from the first well, second well, or both. According to several exemplary embodiments, a pump is used to introduce the pre-pad fluid, pad fluid, and/or slurry and material.

Hydraulic fracturing is a well-known stimulation technique used to recover formation fluids (e.g. oil and gas) from subterranean formations. In hydraulic fracturing, a fracturing fluid is injected through a wellbore to the formation to be treated at a rate and pressure at least sufficient to initiate and/or extend a fracture into the formation. Generally, a pad fluid is injected initially to establish formation breakdown (i.e., to initiate the fracture) and injectivity. The pad fluid is typically free of any proppants. Examples of pad fluids include water, light brines, dilute acids, or water thickened with a polymeric viscosifier (e.g. guar, hydroxypropylguar, xanthan gum, polyacrylamide, hydroxyethylcellulose, and the like) or an oil-in-water emulsion of a light hydrocarbon (e.g. kerosene, diesel oil, etc.). The pad fluids may include additional additives as deemed appropriate by one of ordinary skill in the art such as de-emulsifiers, surfactants, salts, crosslinking agents, clay inhibitors, iron-control additives, breakers, bactericides, caustic, or the like.

A pre-pad fluid may be pumped or injected into the formation before the pad fluid. The pre-pad fluid is a sacrificial fluid that is used to cool the wellbore down and the formation, and to initiate fracture of the formation. The pre-pad fluid can include, for example, water, water with a friction reducer, water energized with gases (e.g., nitrogen and carbon-dioxide), or water with a polymer. Friction reducing polymers suitable for use in the present methods reduce energy losses due to friction in the fluids. Suitable friction reducing polymers include a quaternized aminoalkyl acrylate, such as a copolymer of acrylamide and dimethylaminoethyl acrylate quaternized with benzyl chloride; acrylamide; and a copolymer of acrylamide and acrylic acid. Such friction reducing polymers may further include additional monomers, such as 2-acrylamido-2-methylpropanesulfonic acid, N,N-dimethyl acrylamide, vinylsulfonic acid, N-vinyl acetamide, N-vinyl formamide, and mixtures thereof. Other examples of suitable friction reducing polymers are described in U.S. Pat. Nos. 6,784,141; 7,004,254; 7,232,793; 7,271,134; and 7,504,366, the entire disclosures of which are incorporated herein by reference. Combinations and derivatives of suitable friction reducing polymers may also be suitable for use.

After the placement of the pad fluid, a slurry (e.g., fracturing fluid laden with proppant particles) may be placed in the formation so that the proppant particles may be placed in the resultant fractures to maintain the integrity of the fractures (after the hydraulic pressure is released), thereby forming conductive channels within the formation through which hydrocarbons can flow. Once at least one fracture has been created and at least a portion of the proppant is substantially in place within the fracture, a flush fluid can be pumped into the formation to push the rest of the proppant into the formation. The flush fluid is typically less viscous compared to the pad fluid. The cycle of pumping pre-pad fluid, pad fluid, slurry, and flush fluid may be repeated multiple times if desired to effectively stimulate a subterranean formation.

According to several exemplary embodiments, one or more conformance chemicals are mixed with the pre-pad fluid, pad fluid, and/or slurry. According to several exemplary embodiments, the one or more conformance chemicals are present in the pre-pad, pad, and/or slurry in an amount of about 0.01 to 75 percent (v/v). Conformance chemicals are fluids designed to interact with formation rock and/or formation fluids in such a manner that they reduce or eliminate the rate at which water is produced. Examples of conformance chemicals include monomers, non-crosslinked polymers, resins, crosslinked polymers (e.g., water-soluble crosslinkable polymers), gels (e.g., silica gels), silicates, and cement (e.g., fine-particle cement, conventional cement, and Mg0 cement). Suitable water-soluble crosslinkable polymers are described in U.S. Pat. Nos. 5,836,392; 6,192,986; 6,196,317; and 8,985,212, the entire disclosures of which are incorporated herein by reference.

According to several exemplary embodiments, the conformance chemicals include a crosslinkable polymer system including: (1) an acrylamide-containing polymer and/or carboxylate-containing polymer, (2) a polymerizable water-soluble monomer, and (3) an organic cross-linking agent and/or polyvalent metal ion. Suitable acrylamide-containing polymers include polyacrylamide, partially hydrolyzed polyacrylamide, copolymers of acrylamide and acrylate, or combinations thereof. Suitable carboxylate-containing polymers include carboxylate-containing terpolymers and/or tetrapolymers of acrylate. Suitable polymerizable water-soluble monomers acrylic acid, alkylacrylic acid, ammonium, alkali and/or alkaline earth metal salts of acrylic acid and/or alkylacrylic acid, acrylamide, hydroxyalkylacrylate, hydroxyethylacrylate, hydroxyethylmethacrylate, hydroxymethylacrylate, acrylamido-2-methylpropane sulfonic acid, N-vinylpyrrolidone, and derivatives thereof. Suitable organic cross-linking agents include a polyalkyleneimine, polyethyleneimine, polypropyleneimine; a polyfunctional aliphatic amine; a polyalkylenepolyamine, polyethylenepolyamine, polypropylenepolyamine; a mixture of a phenol, paraformaldehyde and an acid catalyst; a mixture of phenol and formaldehyde; a mixture of phenol, hexamethylenetetramine and an acid catalyst, a mixture of phenyl acetate, hexamethylenetetramine and an acid catalyst; or combinations thereof. Suitable polyvalent metal ions include chromium (III), chromium (VI), aluminum (III), iron (II), iron (III), zirconium (IV), or combinations thereof.

According to several exemplary embodiments, the conformance chemicals include a crosslinkable polymer system of a copolymer of acrylamide and t-butyl acrylate, where the crosslinking agent is polyethyleneimine (PEI). These materials are commercially available from Halliburton Energy Services, Inc. as part of the H$_2$Zero™ conformance control service.

In operation, the copolymer of acrylamide and t-butyl acrylate is mixed with the PEI crosslinker to form a fluid mixture, and the fluid mixture is then injected into a well. The relative amounts of copolymer and crosslinker to be used can be adjusted to provide gelling within a specified time frame based on reaction conditions, such as temperature and pH. For example, the amount of the crosslinker necessary for gelling is inversely proportional to temperature, wherein higher amounts of crosslinker are required at lower temperatures to effect formation of a viscous gel. Adjustment of the amounts of copolymer and crosslinker to provide optimum gelling time as a function of temperature and/or pH is known to one of ordinary skill in the art.

According to several exemplary embodiments, the copolymer of acrylamide and t-butyl acrylate crosslinked with PEI is mixed with the pre-pad fluid or pad fluid, and introduced into a well. The hydraulic fracturing operation may be stopped to allow time for the acrylamide to set and form a sealant in the fractures. The fracturing operation can then be continued, and any fluid produced will divert away from the path of least resistance (i.e., the path that leads to an adjacent well) due to the high resistance now present in that path.

According to several exemplary embodiments, a cement is mixed with the pre-pad fluid, a pad fluid, and/or slurry. For example, the cement may include a hydraulic cement. A variety of hydraulic cements may be utilized in the methods of the present invention, including, but not limited to, those including calcium, aluminum, silicon, oxygen, iron, and/or sulfur, which set and harden by reaction with water. Suitable hydraulic cements include, but are not limited to, Sorel cements, Portland cements, pozzolana cements, gypsum cements, high alumina content cements, slag cements, silica cements, and combinations thereof.

The hydraulic fracturing operation can be halted to allow time for the cement to set and seal the path towards the adjacent well. The fracturing operation can then be resumed and the rest of the treatment fluid pumped to completion.

According to several exemplary embodiments, a silica gel is mixed with the pre-pad fluid or pad fluid, introduced into a formation, and used to block communication between two adjacent wells. Suitable silica gels are described in U.S. Pat. Nos. 7,458,424 and 8,684,081, the entire disclosures of which are incorporated herein by reference.

According to several exemplary embodiments, one or more diverting agents are mixed in the pre-pad fluid, pad fluid, and/or slurry to help reduce permeability of a proppant pack and divert fluid from contacting adjacent wells. According to several exemplary embodiments, the one or more diverting agents are present in the pre-pad, pad, and/or slurry in an amount of about 0.1 to 90 percent (v/v). The diverting agents used in the present invention may include any material or combination of materials that functions to reduce or prevent, either temporarily or permanently, the flow of a fluid into a particular location in a subterranean formation, wherein the material serves to at least partially obstruct the location and thereby cause the fluid to "divert" to a different location.

Examples of materials that may be suitable for use as a diverting agent in the present invention include, but are not limited to, fluids (e.g., aqueous-base and/or non-aqueous-base fluids), emulsions, gels (including but not limited to viscoelastic surfactant gels), surfactants (e.g., soaps or viscoelastic surfactants), foams, particulate materials (e.g., calcium carbonate, silica flour), certain polymers, relative permeability modifiers, degradable materials (e.g., polyesters, orthoesters, poly(orthoesters), polyanhydrides, polylactic acid, dehydrated organic or inorganic compounds, anhydrous borate, salts of organic acids, or any derivative thereof), resins (e.g., water soluble resins, oil soluble resins, etc.), balls, packers (e.g., pinpoint packers and selective injection packers), ball sealers, pack-off devices, sand plugs, bridge plugs, and the like. Suitable diverting agents may include gels, particles, and/or fibers that are natural or synthetic; degradable or nondegradable; and mixtures thereof.

According to several exemplary embodiments, the diverting agent includes a degradable polymer. Examples of degradable polymers suitable for use as the diverting agent include, but are not limited to homopolymers, random, block, graft, star- and hyper-branched aliphatic polyesters, copolymers thereof, derivatives thereof, or combinations thereof. According to several exemplary embodiments, the degradable polymer includes polysaccharides; lignosulfonates; chitins; chitosans; starches; proteins; proteinous materials; fatty alcohols; fatty esters; fatty acid salts; aliphatic polyesters; poly(lactides); poly(glycolides); poly(ε-caprolactones); polyoxymethylene; polyurethanes; poly(hydroxybutyrates); poly(anhydrides); aliphatic polycarbonates; polyvinyl polymers; acrylic-based polymers; poly(amino acids); poly(aspartic acid); poly(alkylene oxides); poly(ethylene oxides); polyphosphazenes; poly(orthoesters); poly(hydroxy ester ethers); polyether esters; polyester amides; polyamides; polyhydroxyalkanoates; polyethyleneterephthalates; polybutyleneterephthalates; polyethylenenaphthalenates; and copolymers, blends, derivatives, or combinations thereof.

According to several exemplary embodiments, the diverting agent includes one or more components of BioVert® NWB diverting agent (a polymer material including polylactide), BioVert® CF diverting agent, BioVert® H150 diverter and fluid loss control material (cryogenically ground polylactic acid having a 150 micron median diameter) or combinations thereof. BioVert® NWB diverting agent is a near-wellbore biodegradable diverting agent, BioVert® H150 diverting agent is a diverter and fluid loss control material, and BioVert® CF is a complex fracture biodegradable diverting agent. Each of these is commercially available from Halliburton Energy Services, Inc.

According to several exemplary embodiments, a first well is stimulated and producing formation fluids. A second new well is then drilled and stimulated using a fracturing operation. In the fracturing operation, a material including a conformance chemical, diverting agent, or both is mixed into the pre-pad fluid, pad fluid, and/or slurry. The pre-pad fluid is introduced into the second well, the pad fluid is then introduced into the second well, the slurry is introduced into the second well, and finally a flush fluid is introduced into the second well. The cycle of pre-pad fluid, pad fluid, slurry, and flush can be repeated multiple times. Formation fluids can then be recovered from the second well without disrupting the production of the first well. In another example, the pre-pad, pad, and slurry are injected in the second well, with the conformance chemical, diverting agent, or both mixed in either or all of the stages. In yet another example, the conformance chemical, diverting agent, or both, are used to prevent well bashing in multiple wells. One or more of the wells can be old wells, one or more of the wells can be new wells, and the conformance chemical and/or diverting agent can used in any of the wells in multiple combinations. In a further example, the conformance chemical, diverting agent, or both are introduced into the old well and new well. In some embodiments, the conformance chemical, diverting agent, or both at introduced into the old well and new well at about the same time.

Although only a few exemplary embodiments have been described in detail above, those of ordinary skill in the art will readily appreciate that many other modifications are possible in the exemplary embodiments without materially departing from the novel teachings and advantages of the present invention. Accordingly, all such modifications are intended to be included within the scope of the present invention as defined in the following claims.

What is claimed is:

1. A method of preventing or minimizing communication between adjacent wells comprising:
   providing a pre-pad fluid comprising a diverting agent; a silica gel; a hydraulic cement; and a conformance chemical selected from a monomer, a non-crosslinked polymer, a crosslinkable polymer system, a resin, and a silicate;
   introducing the pre-pad fluid into a first well adjacent a second well;
   providing a pad fluid comprising the conformance chemical, the diverting agent, the silica gel, and the hydraulic cement;
   introducing the pad fluid into the first well at a rate and pressure sufficient to initiate or extend a fracture in the first well after introducing the pre-pad fluid;
   allowing the conformance chemical, the diverting agent, the silica gel, and the hydraulic cement to block fractures in the first well and thereby preventing or minimizing communication between the first well and the second well; and
   recovering a formation fluid from the first well, the second well, or both.

2. The method of claim 1, further comprising drilling the first well earlier than the second well.

3. The method of claim 1, wherein the conformance chemical comprises the crosslinkable polymer system.

4. The method of claim 3, wherein the crosslinkable polymer system comprises (a) a copolymer of (1) an acrylamide-containing polymer or carboxylate-containing polymer and (2) a polymerizable water-soluble monomer, and (b) an organic cross-linking agent or polyvalent metal ion.

5. The method of claim 1, wherein the diverting agent comprises a degradable polymer.

6. The method of claim 5, wherein the degradable polymer comprises polylactide or polylactic acid.

7. The method of claim 1, wherein the step of allowing the conformance chemical, the diverting agent, the silica gel, and the hydraulic cement to block fractures in the first well comprises stopping a fracturing operation of the first well and allowing time for the conformance chemical, the diverting agent, the silica gel, and the hydraulic cement to set and seal fractures in the first well that lead to the second well.

8. The method of claim 1, further comprising:
providing a slurry fluid comprising the conformance chemical, the diverting agent, the hydraulic cement, and proppant particles; and
introducing the slurry fluid into the first well after the pre-pad fluid and the pad fluid to hold the fracture open.

9. A method of preventing or minimizing communication between adjacent wells comprising:
mixing a diverting agent; a silica gel; a hydraulic cement; and a conformance chemical selected from a monomer, a non-crosslinked polymer, a crosslinkable polymer system, a resin, and a silicate with a fluid to form a pre-pad fluid and a pad fluid;
introducing the pre-pad fluid and then the pad fluid into a first well adjacent a second well, wherein the first well was drilled later than the second well and the pad fluid is introduced into the first well at a rate and pressure sufficient to initiate or extend a fracture in the first well;
introducing a flush fluid, after introducing the pad fluid, into the first well;
allowing the conformance chemical, the diverting agent, the silica gel, and the hydraulic cement to block fractures in the first well and thereby preventing or minimizing communication between adjacent fractures in the first well and the second well; and
recovering a formation fluid from the first well, the second well, or both.

10. The method of claim 9, wherein the conformance chemical comprises the crosslinkable polymer system.

11. The method of claim 10, wherein the crosslinkable polymer system comprises (a) a copolymer of (1) acrylamide-containing polymer or carboxylate-containing polymer and (2) polymerizable water-soluble monomer, and (b) an organic cross-linking agent or polyvalent metal ion.

12. The method of claim 9, wherein the diverting agent comprises a degradable polymer.

13. The method of claim 12, wherein the degradable polymer comprises polylactide or polylactic acid.

14. The method of claim 9, further comprising:
introducing the pre-pad fluid into the second well; and
allowing the conformance chemical, the diverting agent, the silica gel, and the hydraulic cement to block fractures in the second well to prevent or minimize communication between the first well and the second well.

15. The method of claim 9, further comprising:
mixing the conformance chemical, the diverting agent, the hydraulic cement, and proppant particles with fluid to form a slurry fluid; and
introducing the slurry fluid into the first well after introducing the pre-pad fluid and the pad fluid.

16. A method of preventing or minimizing communication between adjacent wells comprising:
providing a pre-pad fluid comprising a crosslinkable water soluble polymer, a hydraulic cement, a silica gel, and a degradable polymer;
introducing the pre-pad fluid into a first well adjacent a second well, wherein the first well was drilled later than the second well;
providing a pad fluid comprising the crosslinkable water soluble polymer, the hydraulic cement, the silica gel, and the degradable polymer;
introducing the pad fluid into the first well at a rate and pressure sufficient to initiate or extend a fracture in the first well after introducing the pre-pad fluid;
allowing the crosslinkable water soluble polymer, the hydraulic cement, the silica gel, and the degradable polymer to block fractures in the first well and thereby preventing or minimizing communication between the first well and the second well; and
recovering a formation fluid from the first well, the second well, or both.

17. The method of claim 16, wherein the crosslinkable water soluble polymer comprises a copolymer of acrylamide and t-butyl acrylate.

18. The method of claim 16, wherein the degradable polymer comprises polylactide or polylactic acid.

19. The method of claim 16, further comprising:
introducing, by a pump, the pre-pad fluid into the second well; and
allowing the crosslinkable water soluble polymer, the hydraulic cement, the silica gel, and the degradable polymer to block fractures in the second well to prevent or minimize communication between the first well and the second well.

20. The method of claim 16, further comprising:
providing a slurry fluid comprising the crosslinkable water soluble polymer, the hydraulic cement, the degradable polymer, and proppant particles; and
introducing the slurry fluid into the first well after introducing the pre-pad fluid and the pad fluid to hold open the fracture.

* * * * *